(12) United States Patent
Hirai et al.

(10) Patent No.: US 7,435,013 B2
(45) Date of Patent: Oct. 14, 2008

(54) VARIABLE DISPERSION COMPENSATION EQUIPMENT, OPTICAL TRANSMISSION SYSTEM USING IT AND METHOD OF SETTING DISPERSION COMPENSATION QUANTITY

(75) Inventors: Tooru Hirai, Yokohama (JP); Takashi Mori, Yokohama (JP); Yasuyuki Fukashiro, Yokohama (JP); Tetsuya Uda, Yokohama (JP); Hiroyuki Nakano, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 99 days.

(21) Appl. No.: 11/190,894

(22) Filed: Jul. 28, 2005

(65) Prior Publication Data
US 2006/0133722 A1 Jun. 22, 2006

(30) Foreign Application Priority Data
Dec. 17, 2004 (JP) ............................. 2004-365893

(51) Int. Cl.
G02B 6/36 (2006.01)
(52) U.S. Cl. ........................................................ 385/88

(58) Field of Classification Search ....................... None
See application file for complete search history.

(56) References Cited

U.S. PATENT DOCUMENTS

| 6,271,945 | B1* | 8/2001 | Terahara ....................... 398/26 |
| 2002/0015207 | A1* | 2/2002 | Ooi et al. ..................... 359/161 |
| 2004/0208619 | A1 | 10/2004 | Li et al. |
| 2004/0234197 | A1 | 11/2004 | Ng et al. |

FOREIGN PATENT DOCUMENTS
JP 2004-193974 7/2004

\* cited by examiner

Primary Examiner—Sung Pak
Assistant Examiner—Hoang Tran
(74) Attorney, Agent, or Firm—Antonelli, Terry, Stout & Kraus, LLP.

(57) ABSTRACT

An optical switch having plural input terminals and plural output terminal, plural dispersion compensators, and a controller for monitoring the change-over state of the optical switch and the dispersion compensation quantities of the plural dispersion compensators and controlling the setting of the optical switch are provided. In response to a request for setting dispersion compensation, the optical switch is set according to the dispersion compensation quantity of each dispersion compensator and the change-over state of the optical switch.

9 Claims, 17 Drawing Sheets

FIG. 6

| TERMINAL NO. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| DISPERSION COMPENSATION QUANTITY [ps/nm] | | | | | 2048 | 1024 | 512 | 256 | 128 | 64 | 32 | 16 | 8 | 4 | 2 | 1 |

FIG. 8

| | | 107A | | | | | | | OPTICAL SWITCH OUTPUT TERMINAL | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| OPTICAL SWITCH INPUT TERMINAL | 1 | – | – | – | – | – | – | – | – | – | – | – | – | – | – | O | – |
| | 2 | – | – | – | – | – | – | – | – | – | – | – | – | – | – | – | – |
| | 3 | – | – | – | – | – | – | – | – | – | – | – | – | – | – | – | – |
| | 4 | – | – | – | – | – | – | – | – | – | – | – | – | – | – | – | – |
| | 5 | O | – | – | – | – | – | – | – | – | – | – | – | – | – | – | – |
| | 6 | – | – | – | – | – | – | – | – | – | – | – | – | – | – | – | – |
| | 7 | – | – | – | – | O | – | – | – | – | – | – | – | – | – | – | – |
| | 8 | – | – | – | – | – | – | – | – | – | – | – | – | – | – | – | – |
| | 9 | – | – | – | – | – | – | – | – | – | – | – | – | – | – | – | – |
| | 10 | – | – | – | – | – | – | – | – | – | – | – | – | – | – | – | – |
| | 11 | – | – | – | – | – | – | – | – | – | – | – | – | – | – | – | – |
| | 12 | – | – | – | – | – | – | – | – | – | – | – | O | – | – | – | – |
| | 13 | – | – | – | – | – | – | – | – | – | – | – | – | O | – | – | – |
| | 14 | – | – | – | – | – | – | – | – | – | – | – | – | – | O | – | – |
| | 15 | – | – | – | – | – | – | – | – | – | – | – | – | – | – | O | – |
| | 16 | – | – | – | – | – | – | – | – | – | – | – | – | – | – | – | – |

FIG. 9

| 91 — TERMINAL NO. | 1 | 2 | 3 | 4 |
|---|---|---|---|---|
| 92 — EXTENSION/ OUTSIDE LINE | OUT. | OUT. | OUT. | OUT. |
| 93 — CHANGE-OVER SETTING | ○ | — | — | — |

FIG. 10

| 94 — TERMINAL NO. | 5 | 6 | 7 | 8 | 9 | 10 | 11 | 12 | 13 | 14 | 15 | 16 |
|---|---|---|---|---|---|---|---|---|---|---|---|---|
| 95 — EXTENSION/ OUTSIDE LINE | EXT. | EXT. | EXT. | EXT. | EXT. | EXT. | EXT. | EXT. | EXT. | EXT. | EXT. | EXT. |
| 96 — CHANGE-OVER SETTING | ○ | — | ○ | — | — | — | — | ○ | ○ | ○ | ○ | — |

FIG.11

| Dispersion Compensation Quantity | | 2048 | 1024 | 512 | 256 | 128 | 64 | 32 | 16 | 8 | 4 | 2 | 1 |
|---|---|---|---|---|---|---|---|---|---|---|---|---|---|
| | Extension Terminal → | 5 | 6 | 7 | 8 | 9 | 10 | 11 | 12 | 13 | 14 | 15 | 16 |
| Outside Line Terminal | 1 | O | | | | | | | | | | | |
| | 2 | | | O | | | | | | | | | |
| | 3 | | | | | | | | O | O | O | O | |
| | 4 | | | | | | | | | | | | |

FIG. 13

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | – | – | – | – | – | – | – | – | – | – | – | – | – | – | O | – |
| 2 | – | – | – | – | – | – | – | – | – | – | – | – | – | – | – | O |
| 3 | – | – | – | – | – | – | – | – | – | – | – | – | – | – | – | – |
| 4 | – | – | – | – | – | – | – | – | – | – | – | – | – | – | – | – |
| 5 | O | – | – | – | – | – | – | – | – | – | – | – | – | – | – | – |
| 6 | – | O | – | – | – | – | – | – | – | – | – | – | – | – | – | – |
| 7 | – | – | – | – | O | – | – | – | – | – | – | – | – | – | – | – |
| 8 | – | – | – | – | – | – | – | – | – | – | – | – | – | – | – | – |
| 9 | – | – | – | – | – | O | – | – | – | – | – | – | – | – | – | – |
| 10 | – | – | – | – | – | – | – | – | O | – | – | – | – | – | – | – |
| 11 | – | – | – | – | – | – | – | – | – | – | – | – | – | – | – | – |
| 12 | – | – | – | – | – | – | O | – | – | – | – | – | – | – | – | – |
| 13 | – | – | – | – | – | – | – | – | – | – | – | O | – | – | – | – |
| 14 | – | – | – | – | – | – | – | – | – | – | – | – | O | – | – | – |
| 15 | – | – | – | – | – | – | – | – | – | – | – | – | – | O | – | – |
| 16 | – | – | – | – | – | – | – | – | – | O | – | – | – | – | – | – |

Rows: OPTICAL SWITCH OUTPUT TERMINAL (107B)
Columns: OPTICAL SWITCH INPUT TERMINAL

FIG.14

| 91 — TERMINAL NO. | 1 | 2 | 3 | 4 |
|---|---|---|---|---|
| 92 — EXTENSION/ OUTSIDE LINE | OUT. | OUT. | OUT. | OUT. |
| 93 — CHANGE-OVER SETTING | ○ | ○ | — | — |

FIG. 15

| DISPERSION COMPENSATION QUANTITY | | 2048 | 1024 | 512 | 256 | 128 | 64 | 32 | 16 | 8 | 4 | 2 | 1 |
|---|---|---|---|---|---|---|---|---|---|---|---|---|---|
| | | 5 | 6 | 7 | 8 | 9 | 10 | 11 | 12 | 13 | 14 | 15 | 16 |
| OUTSIDE LINE TERMINAL | 1 | ○ | | | | | | | | | | | |
| | 2 | | ○ | | | | | | | | | | |
| | 3 | | | ○ | | ○ | | | ○ | ○ | ○ | | ○ |
| | 4 | | | | | | ○ | | | | | ○ | |

EXTENSION TERMINAL

VARIABLE DISPERSION COMPENSATION EQUIPMENT, OPTICAL TRANSMISSION SYSTEM USING IT AND METHOD OF SETTING DISPERSION COMPENSATION QUANTITY

CROSS-REFERENCE TO RELATED APPLICATION

This application relates to Japanese patent application Serial no. 2004-375729, filed on Dec. 27, 2004, entitled "Dispersion Compensation Device an d Dispersion Compensation Method" the content of which are incorporated herein by reference.

CLAIM PRIORITY

The present application claims priority from Japanese patent application serial no. 2004-365893, filed on Dec. 17, 2004, the content of which is hereby incorporated by reference into this application.

BACKGROUND OF THE INVENTION

1. Field of the Invention

The present invention relates to a variable dispersion compensation equipment, an optical transmission system using it, and a method of setting dispersion compensation quantity, and more particularly to a variable dispersion compensation equipment using an optical switch and a controller, an optical transmission system using it, and a method of setting the dispersion compensation quantity therein.

2. Description of Related Art

Loss compensation technology using optical amplifiers, dispersion compensation technology using dispersion compensating fibers and other dispersion compensators, the increased transmission speed, adaptation of optical amplifiers to wider bands and the increased density of wavelength multiplexing have worked together to make possible large-capacity transmission over a long distance.

According to U.S. Pat. No. 5,838,867, cascade connection of dispersion compensating fibers and fibers to be compensated in an appropriate length ratio is claimed to enable wavelength dispersion over the whole system including the dispersion compensating fibers to be improved in the 1.55 µm (micrometer) wavelength band.

U.S. Pat. No. 5,608,562 discloses a variable dispersion compensation equipment combining a three-port optical circulator, plural 2×2 optical switches, plural dispersion compensating fibers and a mirror.

In Japanese Laid-Open Patent Publication No. 2004-193974, an optical cross-connecting equipment which performs variable dispersion compensation as required is described, but no mention is found of the means of variable dispersion compensation.

As the dispersion compensator for use in an optical communication system, it is the usual practice to use what has a fixed dispersion compensation quantity, such as the dispersion compensating fibers disclosed in U.S. Pat. No. 5,838, 867. However, since the dispersion compensation quantity necessary for an optical communication system depends on the type and the length of optical fibers constituting a network, these items of information should be obtained beforehand when a dispersion compensator is to be designed and fabricated, and if no sufficient information is available, the wavelength dispersion of the optical fibers to be actually used needs to be measured before the designing and fabrication.

If these items of information are acquired only immediately before the introduction of the system, the process of designing and fabricating the dispersion compensator may affect the start-up timing of the system operation.

Further, where the dispersion compensation quantity of the dispersion compensator is fixed, if the dispersion compensation quantity is varied finely to enhance the accuracy of dispersion compensation, many different types of dispersion compensators will be needed, causing a problem of complex management.

If the optical fiber length is to be altered on account of trouble or relocation, the dispersion compensation quantity should be altered accordingly, and the dispersion compensators should be replaced to match the changed quantity. Since this replacement is a manual operation entailing the disengagement and reengagement of optical connectors, the optical communication line cannot be used for a few seconds or even dozens of seconds.

SUMMARY OF THE INVENTION

A variable dispersion compensation equipment according to the invention includes an optical switch having M input terminals and M output terminals and capable of connecting any desired one of the input terminals and one of the output terminals, N input units connected to the input terminals, N output units connected to the output terminals, two or more but (M−N) or fewer dispersion compensating modules provided between one of the output terminals and one of the input terminals, and a controller for controlling change-over of the optical switch, wherein optical signals inputted to one of the input units are outputted, after being caused to pass at least one of the dispersion compensating modules, from one of the output units.

BRIEF DESCRIPTION OF THE DRAWINGS

Preferred embodiments of the present invention will now be described in conjunction with the accompanying drawings, in which:

FIG. 6 illustrates a dispersion compensator management table;

FIG. 8 illustrates an optical switch management table;

FIG. 9 illustrates the result of searching for the change-over state of the outside line terminal;

FIG. 10 illustrates the result of searching for the change-over state of the extension terminal;

FIG. 11 illustrates an extension terminal involved in dispersion compensation setting for the outside line terminal;

FIG. 13 illustrates the optical switch management table before altering the dispersion compensation quantity;

FIG. 14 illustrates the result of searching for the change-over setting of the outside line terminal and the extension terminal;

FIG. 15 illustrates an extension terminal involved in dispersion compensation setting for the outside line terminal;

DETAILED DESCRIPTION OF THE PREFERRED EMBODIMENTS

Preferred embodiments of the present invention will now be described below with reference to the accompanying drawings.

Figure 1:
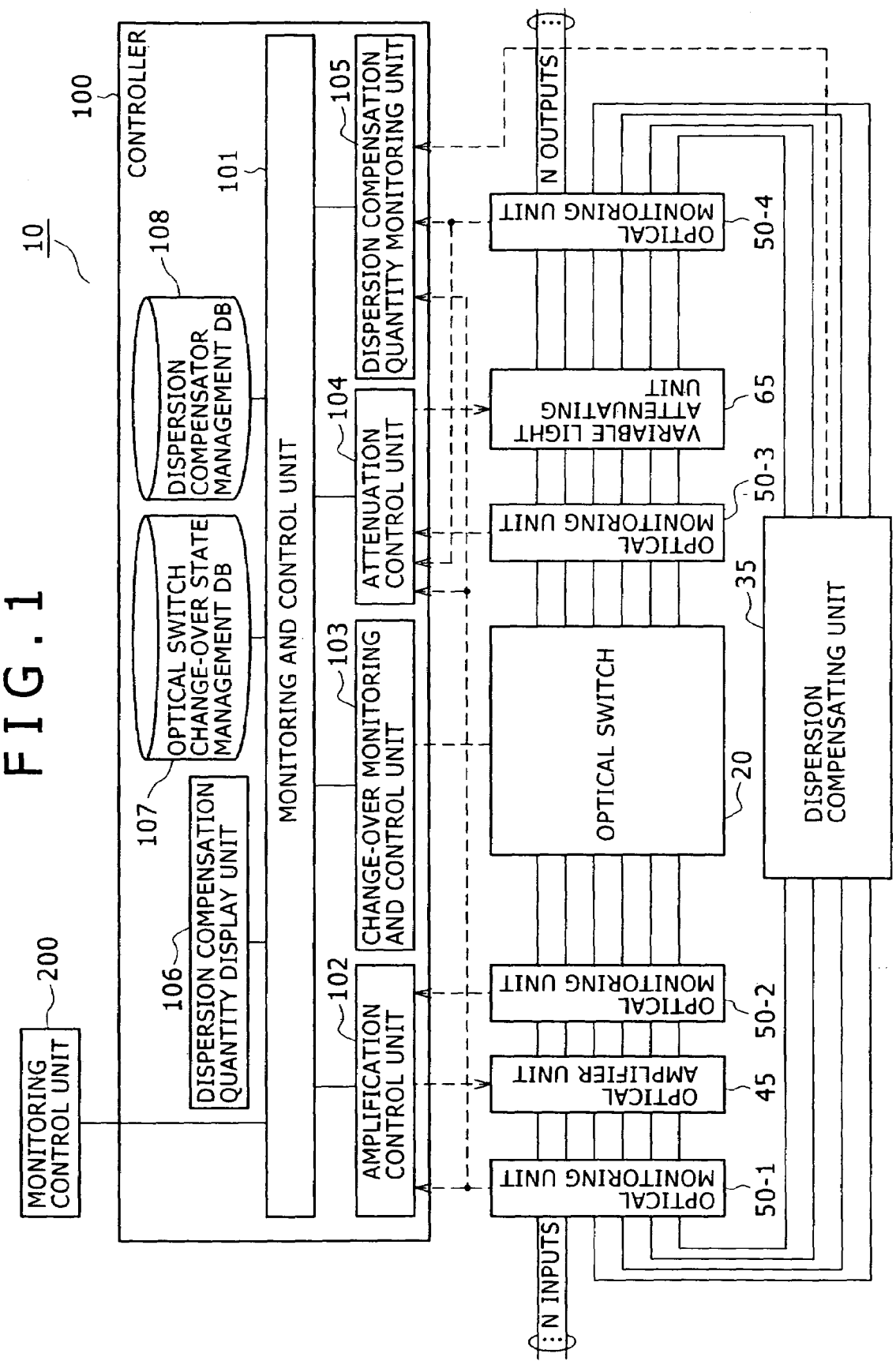
FIG. 1 is a schematic functional block diagram of a variable dispersion compensation equipment.
Figure 2:
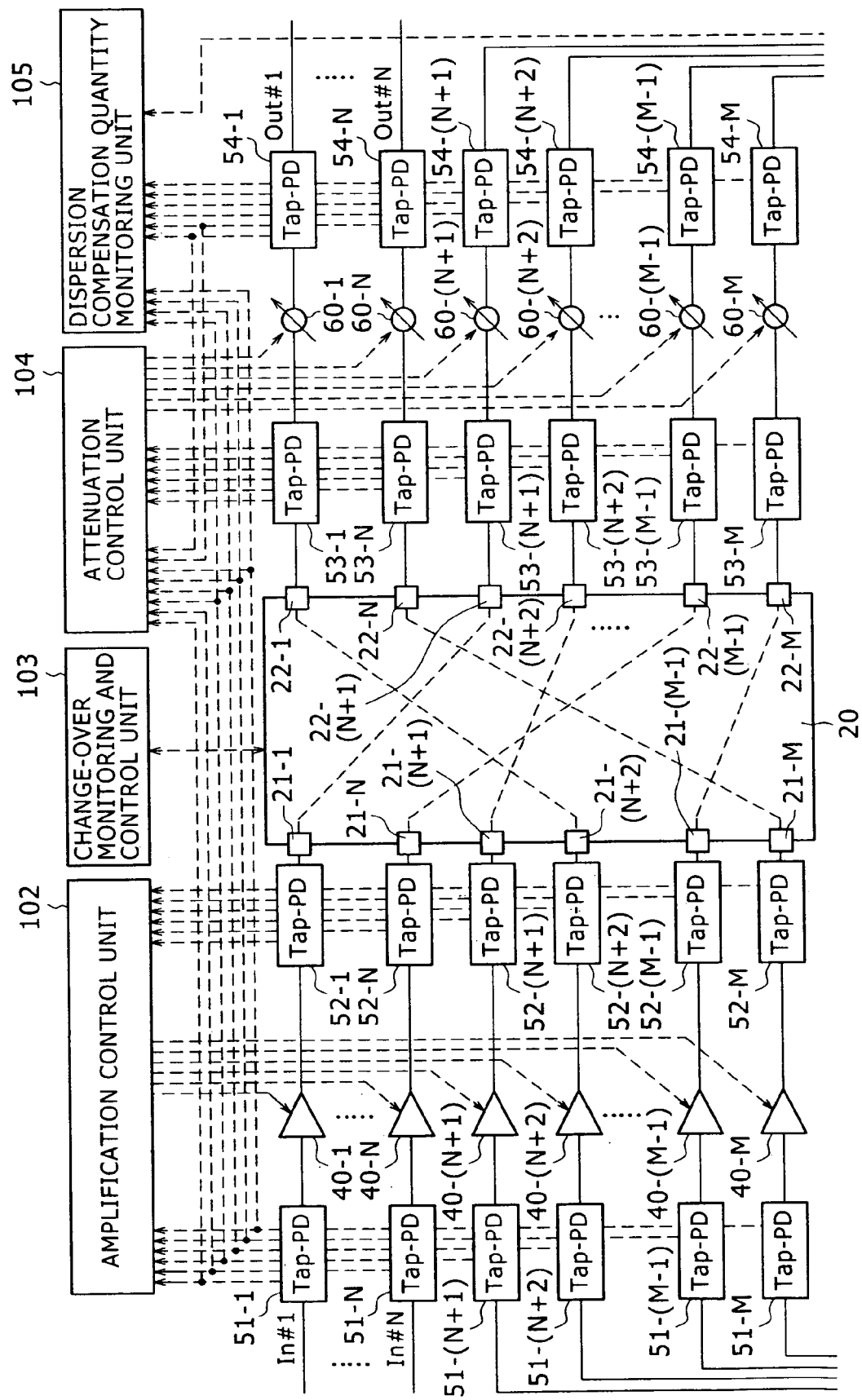
FIG. 2 is a functional block diagram of the optical switch unit of the variable dispersion compensation equipment.
Figure 3:
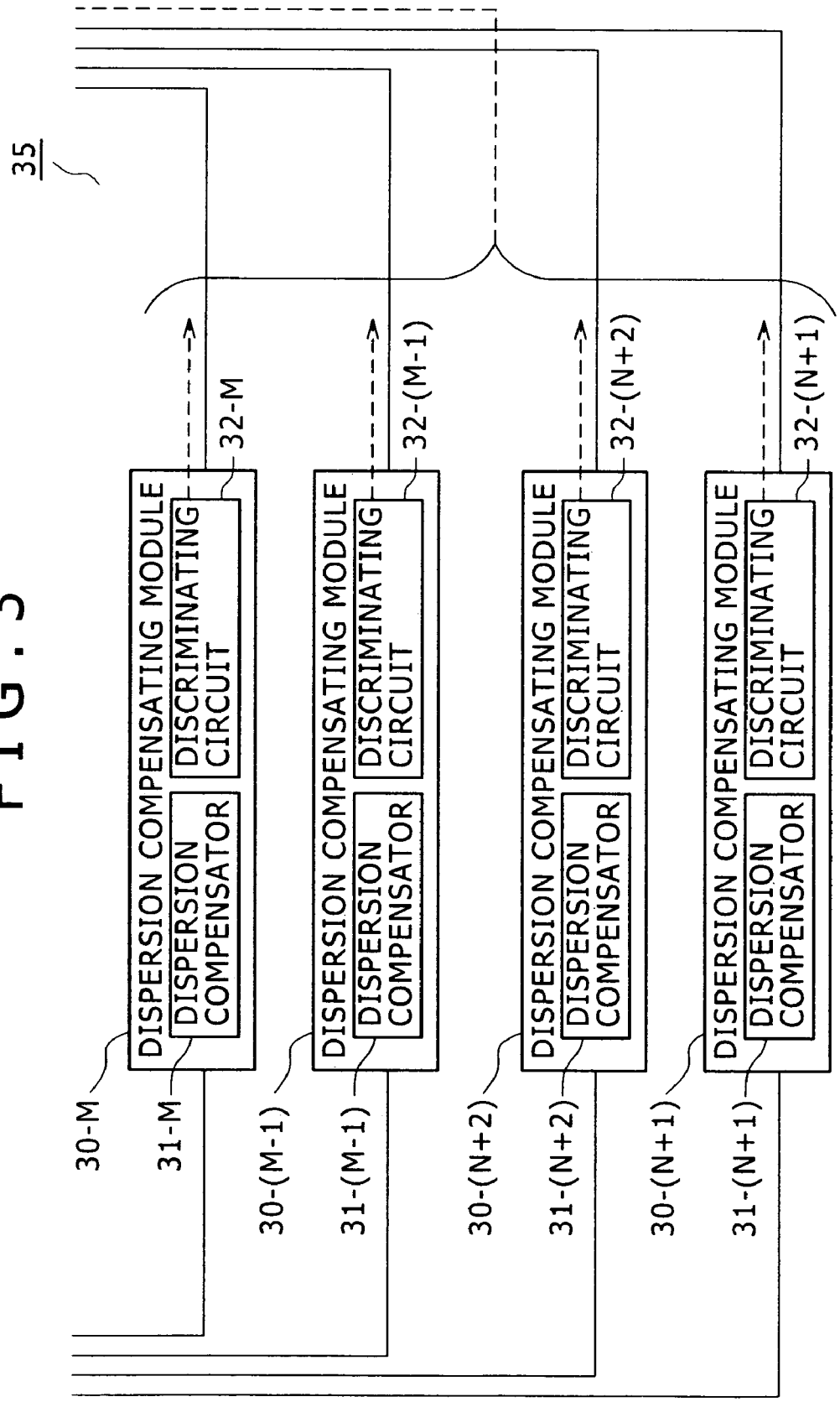
FIG. 3 is a functional block diagram of the dispersion compensating unit of the variable dispersion compensation equipment.
Figure 4:
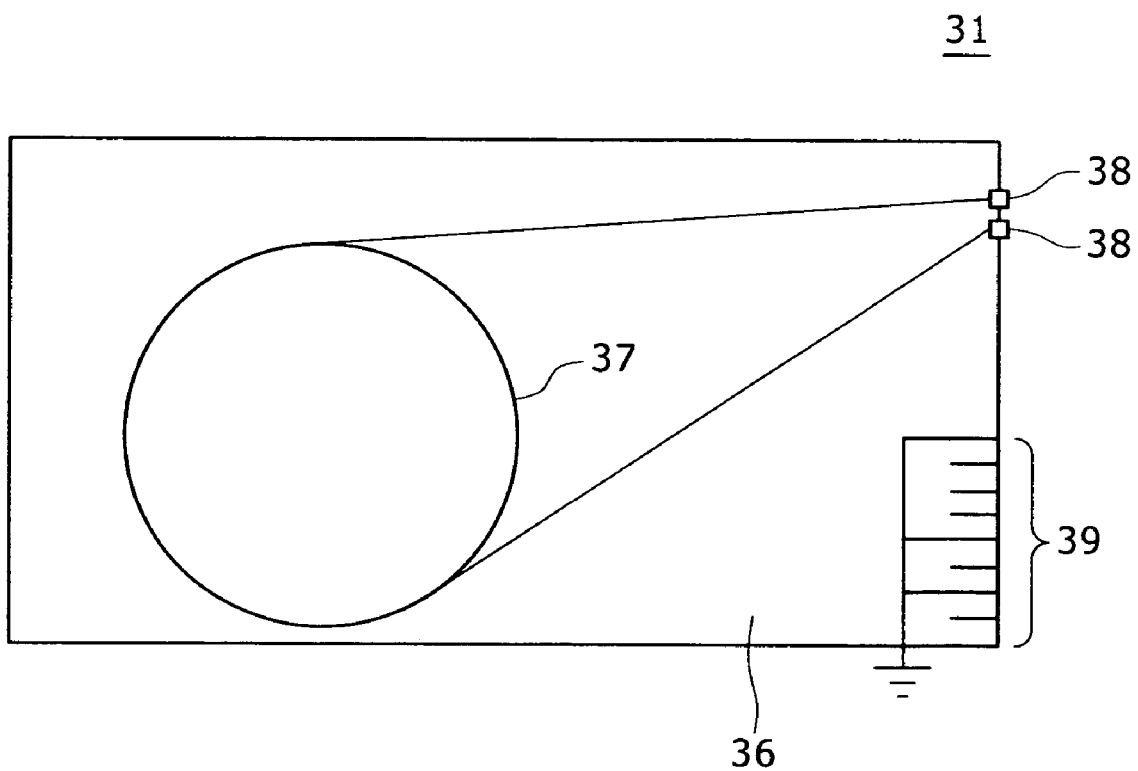
FIG. 4 is a profile of the dispersion compensator.
Figure 5A:
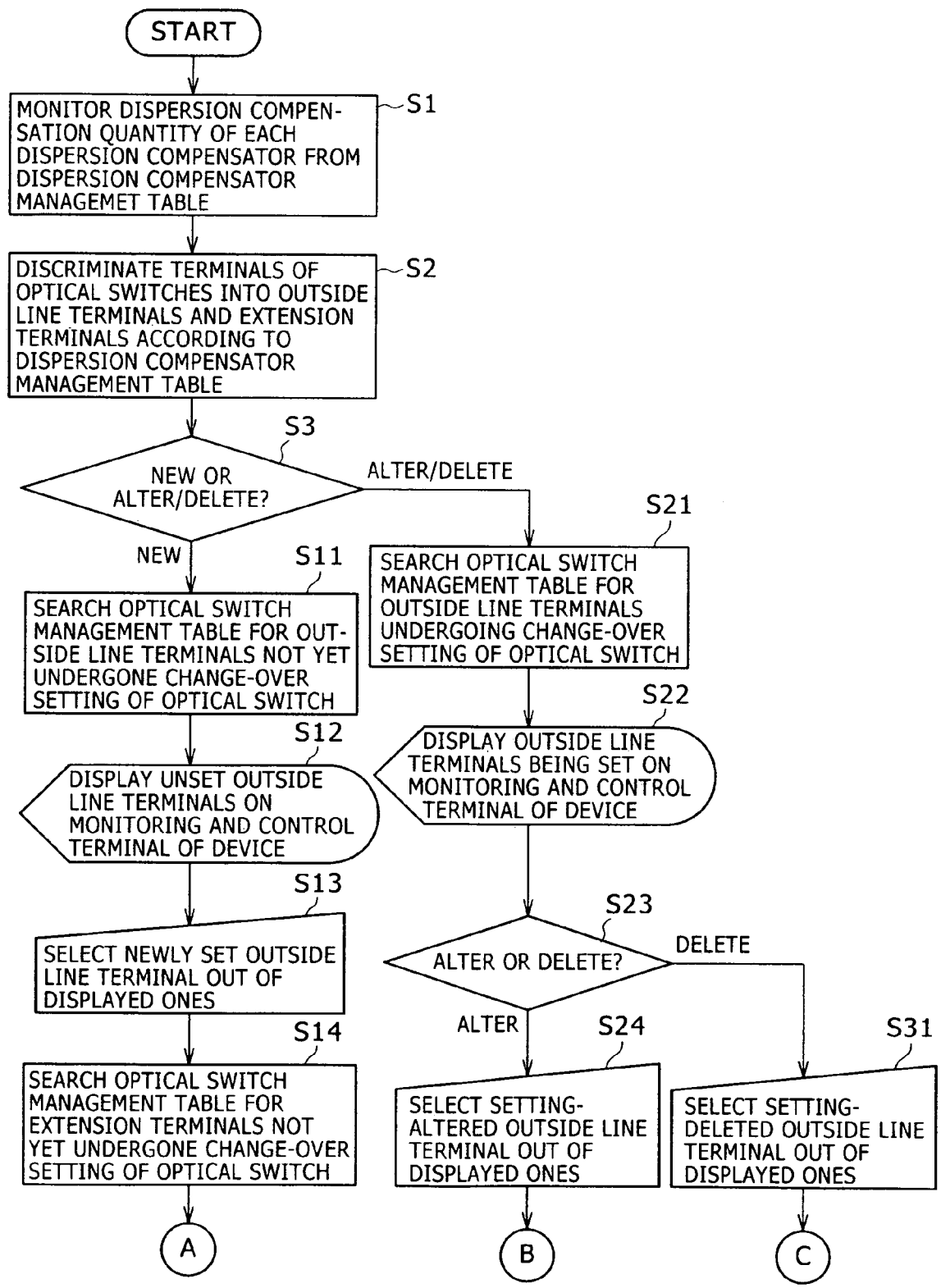
FIG. 5A is a flowchart of the operations of the variable dispersion compensation equipment (part 1)
Figure 5B:
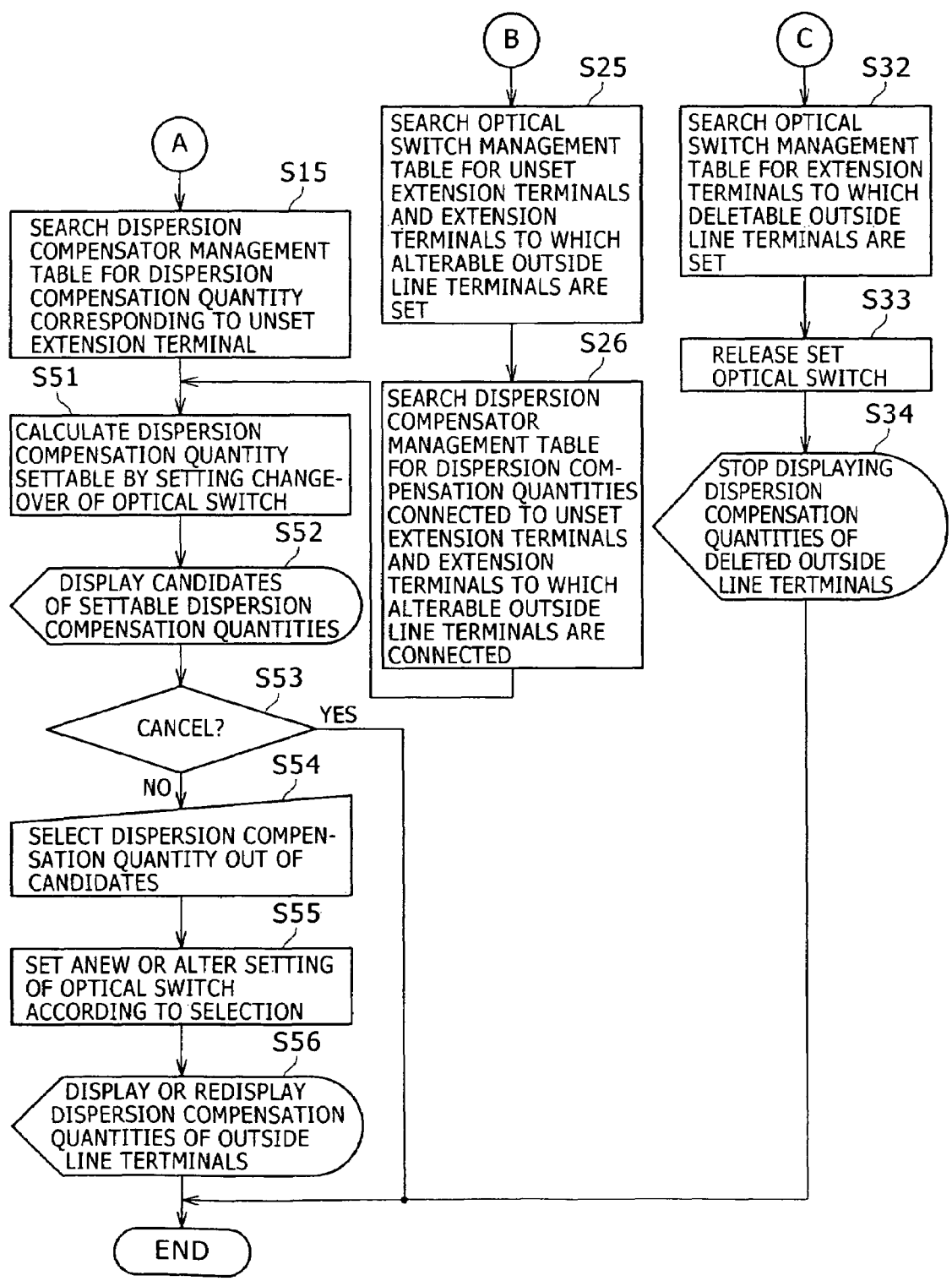
FIG. 5B is another flowchart of the operations of the variable dispersion compensation equipment (part 2)
Figure 7:
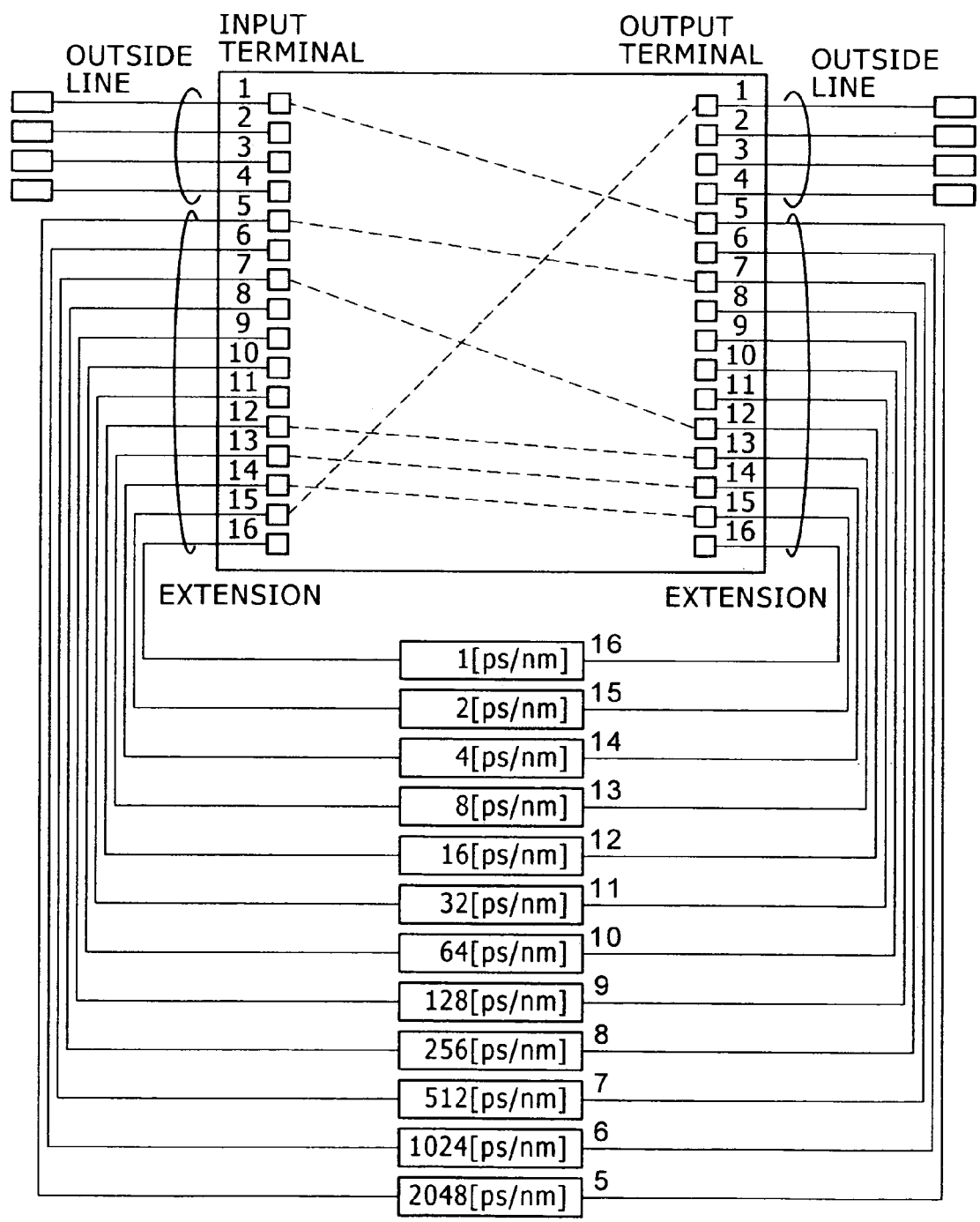
FIG. 7 illustrates the change-over state of the optical switch before new addition.

Embodiment 1 will be described with reference to FIG. 1 through FIG. 16. FIG. 1 here is a schematic functional block diagram of a variable dispersion compensation equipment, which is a preferred embodiment of the invention. FIG. 2 is a functional block diagram of the optical switch unit of the variable dispersion compensation equipment, which is the preferred embodiment of the invention. FIG. 3 is a functional block diagram of the dispersion compensating unit of the variable dispersion compensation equipment, which is the embodiment of the invention. FIG. 4 is a profile of the dispersion compensator in the embodiment of the invention. FIG. 5 are flowcharts of the operations of variable dispersion compensation in the embodiment of the invention. FIG. 6 illustrates a dispersion compensator management table in the embodiment of the invention. FIG. 7 illustrates the change-over state of the optical switch before new addition in the embodiment of the invention. FIG. 8 illustrates an optical switch management table in the embodiment of the invention.

Figure 12:
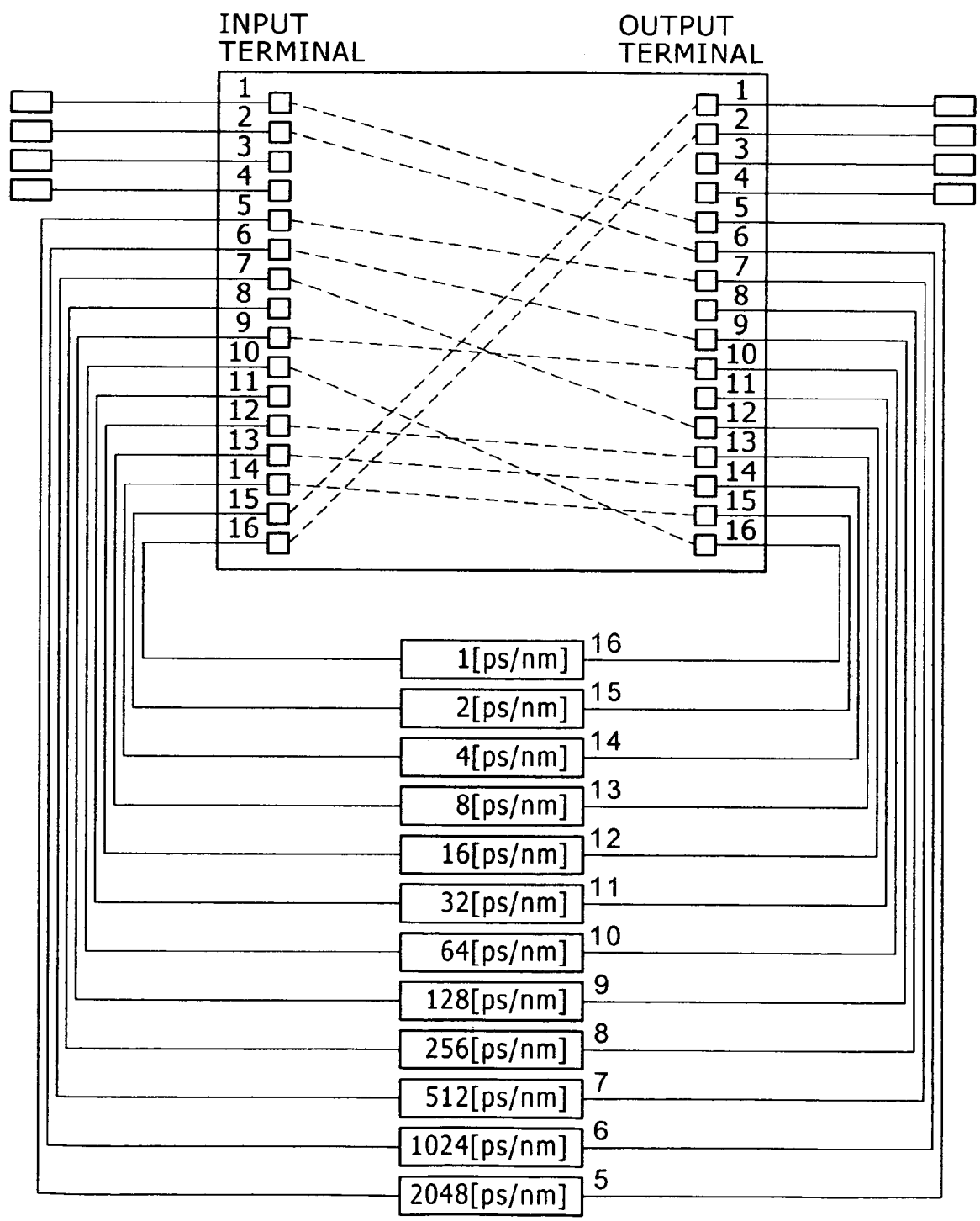
FIG. 12 illustrates the change-over state of optical switch before altering the dispersion compensation quantity.
Figure 16:
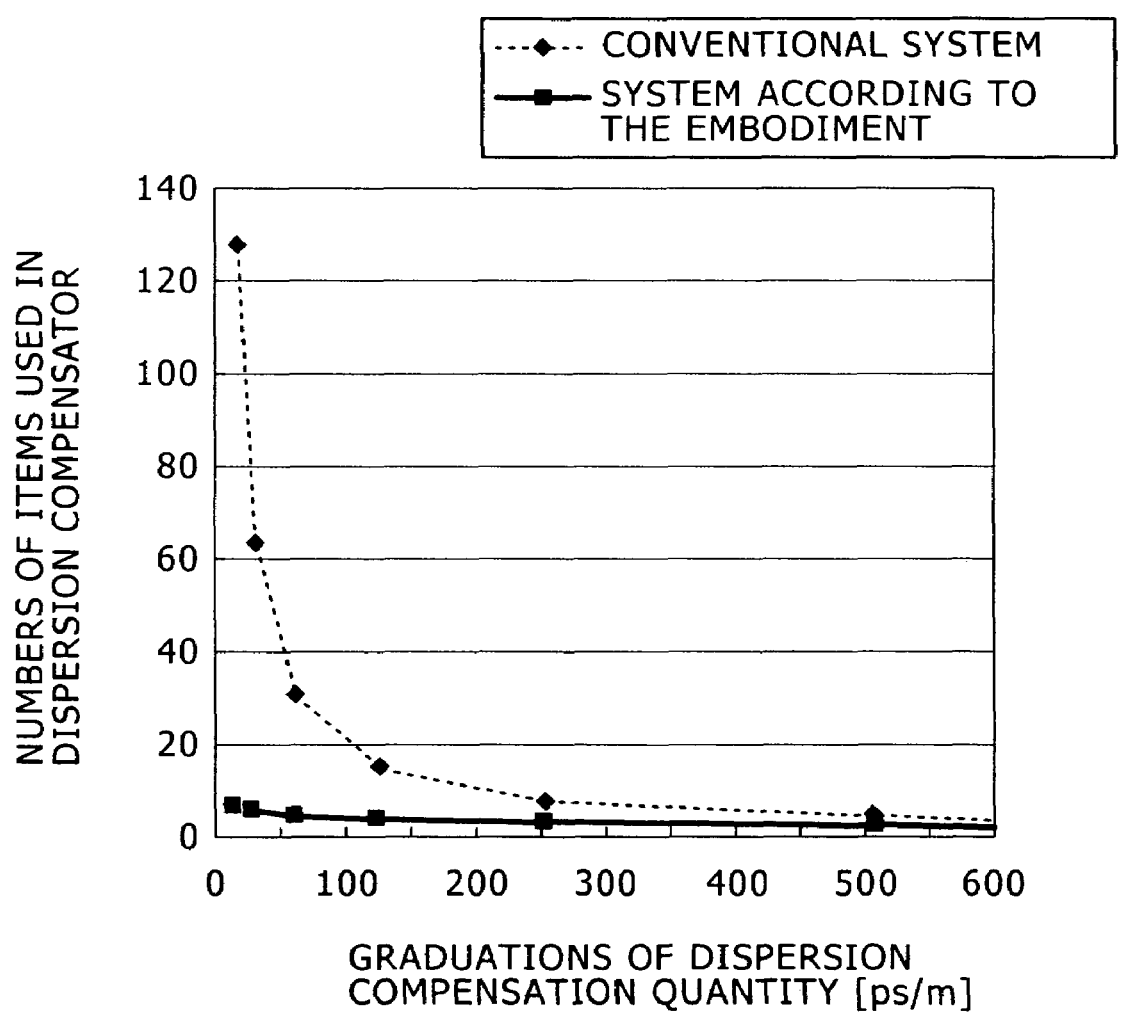
FIG. 16 illustrates the number of items required for dispersion compensation.

FIG. 9 illustrates the result of searching for the change-over state of the outside line terminal in the embodiment of the invention. FIG. 10 illustrates the result of searching for the change-over state of the extension terminal in the embodiment of the invention. FIG. 11 illustrates an extension terminal involved in dispersion compensation setting for the outside line terminal in the embodiment of the invention. FIG. 12 illustrates the change-over state of optical switch before altering the dispersion compensation quantity in the embodiment of the invention. FIG. 13 illustrates the optical switch management table before altering the dispersion compensation quantity in the embodiment of the invention. FIG. 14 illustrates the result of searching for the change-over setting of the outside line terminal and the extension terminal in the embodiment of the invention. FIG. 15 illustrates an extension terminal involved in dispersion compensation setting for the outside line terminal in the embodiment of the invention. FIG. 16 illustrates the number of items required for dispersion compensation in the embodiment of the invention.

A variable dispersion compensation equipment 10 shown in FIG. 1 includes an optical switch 20 which has M input terminal and M output terminals and connects any desired input terminal to any desired output terminal; a dispersion compensating unit 35; an optical amplifying unit 45 for compensating the insertion losses of the dispersion compensating unit 35 and the optical switch 20; a variable light attenuating unit 65 for adjusting the input level of the optical amplifying unit 45; an optical monitoring unit 50-1 for monitoring the optical power of input signals to the optical amplifying unit 45; an optical monitoring unit 50-2 for monitoring the optical power of output signals from the optical amplifying unit 45; an optical monitoring unit 50-3 for monitoring the optical power of input signals to the variable light attenuating unit 65; an optical monitoring unit 50-4 for monitoring the optical power of output signals from the variable light attenuating unit 65; a controller 100 for monitoring and controlling these elements; and a monitoring control terminal 200. M is an integer not smaller than 3, because variable dispersion compensation requires at least one each of input and output and at least two dispersion compensating modules.

The optical monitoring unit 50-1 also has a function to monitor the output light level of the dispersion compensating unit 35. The optical monitoring unit 50-4 also has a function to monitor the input light level of the dispersion compensating unit 35. Further, out of the M inputs to the optical monitoring unit 50-1, N inputs constitute an input unit for the variable dispersion compensation equipment 10. Also, out of the M outputs from the optical monitoring unit 50-4, N outputs constitute an output unit for the variable dispersion compensation equipment 10. N is an integer not smaller than 1 and smaller than M by at least 2.

The controller 100 includes an amplification control unit 102 for controlling the optical amplifying unit 45 on the basis of the optical power monitored by the optical monitoring unit 50-1 and the optical power monitored by the optical monitoring unit 50-2; an attenuation control unit 104 for controlling an optical attenuator on the basis of the optical power monitored by the optical monitoring unit 50-3 and the optical power monitored by the optical monitoring unit 50-1; a dispersion compensation quantity monitoring unit 105 for monitoring the dispersion compensation quantity; a dispersion compensator management DB 108 for managing data on the dispersion compensation quantity of the dispersion compensating unit 35 monitored by the dispersion compensation quantity monitoring unit 105 and an optical switch change-over state management DB 107 for managing the switch change-over state of the optical switch 20; a monitoring and control unit 101 for monitoring and controlling these elements and determining a control signal for the optical switch 20 by referencing the optical switch change-over state management DB 107 and the dispersion compensator management DB 108 in response to a request for dispersion compensation setting from the monitoring control terminal 200; a change-over monitoring and control unit 103 for monitoring and controlling the change-over of the optical switch 20 in accordance with a control signal from the monitoring and control unit 101; and a dispersion compensation quantity display unit 106 for displaying the total dispersion compensation quantity of the plural dispersion compensating units 35 connected by the optical switch on the basis of the optical switch change-over state management DB 107 and the dispersion compensator management DB 108.

More specifically, the amplification control unit 102 controls the gain of the optical amplifying unit 45 on the basis of the monitored levels of the optical powers of input signals to the optical amplifying unit 45 and the monitored levels of the optical powers of the output signals from the optical amplifying unit so that the ratio between them is kept within a predetermined range. The attenuation control unit 104 controls the quantity of attenuation by the variable light attenuating unit 65 on the basis of the monitored levels of the optical powers of input signals to the variable light attenuating unit 65 and the monitored levels of the optical powers of the input signal to the optical amplifying unit 45 so that the ratios between them is kept within a predetermined range.

The optical powers monitored by the attenuation control unit 104 here are not the optical powers before and after the variable light attenuating unit 65 but the input optical power of the variable light attenuating unit 65 and the output optical power of the dispersion compensating unit 35. Thus, control is so effected as, when the dispersion compensation quantity, namely the loss, has varied, to vary the attenuation quantity provided by the variable light attenuating unit 65 thereby to keep the sum of the input and output optical powers within a predetermined range.

The dispersion compensation quantity monitoring unit 105 has a function to monitor the optical power monitored by the optical monitoring unit 50-4 and the optical power monitored by the optical monitoring unit 50-1 and thereby to monitor any loss inflicted by the dispersion compensating unit 35. This is a function to check, by utilizing the proportional relationship between the dispersion compensation quantity and the loss, if there is any wrong connection of optical fibers between the dispersion compensating unit 35 and the optical monitoring unit 50-4 or the optical monitoring unit 50-1. More specifically, it ensures that there is no inconsistency of the difference between the optical powers monitored by the optical monitoring unit 50-1 and the optical powers monitored by the optical monitoring unit 50-4 with a dispersion compensation quantity discriminated by a discriminating circuit to be described afterwards with reference to FIG. 3.

The connecting relationships between the optical monitoring units 50, the optical amplifying unit 45, the optical switch 20 and the variable light attenuating unit 65 on one hand and the amplification control unit 102, the change-over monitoring and control unit 103, the attenuation control unit 104 and the dispersion compensation quantity monitoring unit 105 on the other will be described in derail below with reference to FIG. 2. Every one of the optical monitoring units 50 consists of M combinations each of a tap for branching part of optical signals and a photodiode (PD) for monitoring the power of the branched optical signals. This kind of combination will be hereinafter called Tap-PD. Optical signals having passed each tap will be delivered as it is to the next optical component. In the optical monitoring unit 50-1, N Tap-PDs from a Tap-PD 51-1 through a Tap-PD 51-N monitor the power of optical signals from outside the variable dispersion compensation equipment 10, and (M–N) Tap-PDs from a Tap-PD 51-(N+1) through a Tap-PD 51-M monitor the powers of optical signals from inside the variable dispersion compensation equipment 10. The optical power monitored by the Tap-PD 51 is sent to the amplification control unit 102 and the attenuation control unit 104. Further the optical powers monitored by the Tap-PD 51-(N+1) through the Tap-PD 51-M are also sent to the dispersion compensation quantity monitoring unit 105.

The optical monitoring unit 50-2, the optical monitoring unit 50-3 and the optical monitoring unit 50-4 transmit to the amplification control unit 102, the attenuation control unit 104 and the dispersion compensation quantity monitoring unit 105 the optical powers they have monitored as does the optical monitoring unit 50-1. The optical powers monitored by the N Tap-PDs from the Tap-PD 54-1 through the Tap-PD 54-N are also sent to the attenuation control unit 104. In the optical monitoring unit 50-4, the optical signals having passed the N Tap-PDs from the Tap-PD 54-1 through the Tap-PD 54-N are sent to the outside of the variable dispersion compensation equipment 10. The optical signals having passed the (M–N) Tap-PDs from the Tap-PD 54-(N+1) through the Tap-PD 54-M are sent to the dispersion compensating unit 35.

The optical amplifying unit 45, consisting of M optical amplifiers 40, is so controlled that the output of each amplifier is controlled by the amplification control unit 102 within a predetermined range. These optical amplifiers 40 may either be optical fiber amplifiers or optical semiconductor amplifiers. The variable light attenuating unit 65 consist of M variable optical attenuators 60, each controlled by the attenuation control unit 104. In particular, the variable optical attenuator 60-(N+1) through the variable optical attenuator 60-M are so controlled as to keep the loss due to dispersion compensation and that attributable to the variable optical attenuators within a predetermined range.

The optical switch 20 is an M-input M-output optical switch, provided with input terminals 21 and output terminals 22. The input terminal 21-1 through the input terminal 21-N are referred to as outside line terminals, and the input terminal 21-(N+1) through the input terminal 21-M, as outside line terminals. Similarly, the output terminal 22-1 through the output terminal 22-N are referred to as outside line terminals, and the output terminal 22-(N+1) through the output terminal 22-M, as outside line terminals. The optical switch 20 is controlled by the change-over monitoring and control unit 103. The optical switch 20 may either be a planar lightwave circuit (PLC) or an MEMS.

The dispersion compensating unit 35 will now be described with reference to FIG. 3 and FIG. 4. The dispersion compensating unit 35 consists of (M–N) dispersion compensating modules 30. Each of the dispersion compensating modules 30 consists of a dispersion compensator 31 for canceling dispersion on the transmission path and a discriminating circuit 32 for discriminating the dispersion quantity of the dispersion compensator 31. The dispersion compensator 31, as shown in FIG. 4, includes a dispersion compensating fiber 37 having a wavelength dispersion characteristic reverse in polarity to the fiber of the transmission path, an input/output optical connector 38 of the dispersion compensating fiber 37 and electrical terminals 39 formed over a printed circuit board 36. There are eight electrical terminals 39, some of which are grounded. The dispersion compensator 31 is fixed by being inserted into an electrical connector provided on a back wiring board (not shown). At the same time, the optical connector is also connected. The discriminating circuit 32, formed on the back wiring board, generates eight-bit dispersion compensation quantity information in which the ground potential of the electrical terminals 39 is represented by "1" and the floating potential of the same is represented by "0" (10001010=8A in FIG. 4). The dispersion compensation quantity monitoring unit 105 updates the dispersion compensator management DB 108 according to this dispersion compensation quantity information. The number of items that can be discriminated by eight-bit dispersion compensation quantity information is 128, which is sufficiently large.

The operation of the variable dispersion compensation equipment will be described with reference to FIGS. 5. The flows charted therein are executed by the CPU (not shown) of the monitoring and control unit 101. In the following description, M will be supposed to be 16, and N will be supposed to be 4.

The controller 100 searches for the dispersion compensation quantity of each of the dispersion compensating modules 30-(N+1) through 30-M by referencing a dispersion compensator management table 108A stored in the dispersion compensator management DB 108 (S1). The elements of the dispersion compensator management table 108A are, as shown in FIG. 6, a terminal number row 61 and a dispersion compensation quantity row 62. Dispersion compensation quantities which are powers of 2 are made available in the invert sequence of terminal numbers, such as "1" for terminal number 16, "2" for terminal number 15 and "4" for terminal number 14, up to "2048" for terminal number 5. The dispersion compensation quantity row 61 is blank for terminal numbers 1 through 4, which are set aside for connection to outside lines.

The terminals of the optical switch 20 are so connected that terminals of respectively the same numbers as the terminals of the dispersion compensating modules 30-(N+1) through 30-M meet each other. The controller 100 discriminates the terminals of the optical switch 20 into terminals to which none of the dispersion compensating modules 30-(N+1) through 30-M is connected (outside line terminals) and those to which modules are connected (extension terminals) according to the dispersion compensator management table 108A (S2).

The operator of the monitoring and control terminal 100 selects the type of operation to be executed (new, alter or delete) (S3). When a new variable dispersion compensation is to be set, the operator proceeds to S11. As an example of new setting, a case will be considered below in which a dispersion compensation is newly set in an outside line terminal 2 from the change-over state of the optical switch 20 shown in FIG. 7. As evident from this example, new setting is not limited to what is done in a state of absence of switch setting but includes a case of addition.

In the change-over state shown in FIG. 7 here, since connection between an input terminal 1 and an output terminal 5 is selected, a dispersion compensating fiber of 2048 ps/nm is selected, followed by cascade connection of dispersion compensating fibers of 512 ps/nm, 16 ps/nm, 8 ps/nm, 4 ps/nm and 2 ps/nm in that order, resulting in an output from an output terminal 1. Thus, out of optical signals inputted to the input terminal 21-1 of the switch 20 of the variable dispersion compensation equipment 10, only a total of 2590 ps/nm is compensated for dispersion, and the compensated signals are outputted from the output terminal 22-1 of the switch 20. Losses due to the plural dispersion compensating modules 32 and the optical switch 20 are also compensated for by the optical amplifiers 40.

The controller 100 references an optical switch management table 107A (FIG. 8) stored in the optical switch change-over state management DB 107, searches for outside line terminals (terminal numbers 1 through 4 in this example) for which the change-over of the optical switch 20 is not yet set (S11). More specifically, as shown in FIG. 8, it focuses on some outside line terminal (e.g. "2"), and checks whether or not its input and output terminals are set for changing over. If there are not, they are determined to be "unset". Or if at least one is set, they are determined to be "set". The result of searching all the outside line terminals for their change-over setting states is displayed on the monitoring terminal of the equipment (S12). This display is shown in FIG. 9. In FIG. 9, a terminal number row 91 shows terminal numbers; an extension/outside line row 92 shows "Ex." or "Out." indicating extension or outside line; and a change-over setting row 93 indicates the presence of setting by "0" and the absence of setting by "–". Therefore, out of the outside line terminals 1 through 4, "2", "3" and "4" are unset terminals. "Unset" means that the input terminal is connected to no output terminal whatsoever.

The operator selects one of the displayed candidates (S13). The following description supposes that the operator has selected terminal number 2.

The controller 100 references the optical switch management table to search for an extension terminal for which the change-over of the optical switch is not yet set (S14). The pertinent display is shown in FIG. 10, wherein a terminal number row 94 shows terminal numbers; an extension/outside line row 95 shows "Ex." or "Out." indicating extension or outside line; and a change-over setting row 96 indicates the presence of setting by a small circle and the absence of setting by a hyphen. Therefore, out of the extension terminals 5 through 16, "6", "8", "9", "10", "11" and "16" are unset terminals.

The controller 100 references the dispersion compensator management table 108 to search for a dispersion compensation quantity connected to an unset extension terminal (S15). As a result of S14 and S15, data shown in FIG. 11 are generated. The extension terminal numbers surrounded by bold lines in FIG. 11 denote extension terminals connected to "unoccupied" dispersion compensating fibers. Next, the controller 100 computes the quantity of dispersion compensation that can be provided by setting the change-over for the unset extension terminals in the optical switch 20 by Equation (1) (S51):

Dispersion compensation quantity ($C_6$, $C_8$, $C_9$, $C_{10}$, $C_{11}$, $C_{16}$)=$C_6\times1024+C_8\times256+C_9\times128+C_{10}\times64+C_{11}\times32+C_{16}$ ... (1) (wherein each of $C_6$, $C_8$, $C_9$, $C_{10}$, $C_{11}$ and $C_{16}$ is 0 or 1)

The controller 100 displays the result of computation (e.g. "1 ps/nm", "32 ps/nm", "33 ps/nm", ..., "1217 ps/nm", ..., "1504 ps/nm", "1505 ps/nm") on the monitoring control terminal 200 (S52). Looking at this display, the operator of the monitoring control terminal selects either setting or cancellation (S53). If he selects setting, the operator will proceed to S54 and selects the appropriate one out of the displayed dispersion compensation quantities (e.g. "1217 ps/nm"=dispersion compensation quantity (1, 0, 1, 1, 0, 1)) (S54). The controller 100 sets the change-over on the optical switch 20 on the basis of the selected dispersion compensation quantity "1217 ps/nm" (S55). In accordance with this change-over setting, the controller displays the dispersion compensation quantity (e.g. "1217 ps/nm") (S56) to end the flow. When cancellation is selected at S53, the sequence of operations is stopped.

Change-over setting for the optical switch 20 will now be described with reference to FIG. 12 and FIG. 13. The selected outside line terminal is "2" and the selected extension terminals are "6", "9", "10" and "16". Therefore, the input terminal 21-2 and the output terminal 22-6 of the optical switch 20 are connected to each other, and so are the input terminal 21-6 and the output terminal 22-9, the input terminal 21-9 and the output terminal 22-10, the input terminal 21-10 and the output terminal 22-16, and the input terminal 21-16 and the output terminal 22-2. An optical switch management table 107B at the time is shown in FIG. 13.

Although the foregoing description referred to the "addition" of dispersion compensations, if the setting of the optical switch is entirely new, obviously the available options of dispersion compensation quantity can be found anywhere between 1 ps/nm and 4095(2048*2−1) ps/nm.

At S3, if any set dispersion compensation quantity is to be altered or set dispersion compensation is to be deleted on account of trouble or relocation, the control will proceed to S21. Here is considered, as alteration of a set dispersion compensation quantity, alteration of the dispersion compensation quantity (2590 ps/nm) of the outside line terminal 1 in the change-over state of the optical switch 20 shown in FIG. 12 and FIG. 13. The controller 100 references the optical switch management table 107B shown in FIG. 13 to search for an outside line terminal for which the change-over of the optical switch 20 is set (S21). The result of searching for the change-over setting state of every outside line terminal is shown in FIG. 14. In this example, "1" and "2" out of the outside line terminals 1 through 4 are set terminals. The controller 100 displays the set outside line terminals ("1" and "2" in this example) on the monitoring control terminal of the equipment (S22). Then the operator of the monitoring control terminal selects altered setting or setting deletion (S23). If he has selected alteration, the operator will proceed to S24 and select the terminal to be altered in setting ("1" in this example) out of the displayed outside line terminals ("1" and "2") (S24). The controller 100 references the optical switch management table 107B (FIG. 13) to search for extension terminals related to an unset extension terminal and the outside line terminal "1" to be altered in setting (S25). As a result, "5", "7", "8", "11", "12", "13", "14" and "15", which are the pertinent ones, are found out of the extension terminals 5 through 16.

The controller 100 searches the dispersion compensator management table 108A for the quantity of dispersion compensators to be connected to unset extension terminals and the quantity of dispersion compensators to be connected to the extension terminal to be altered in setting (S26). As a result of S25 and S26, the controller 100 generates data shown in FIG. 16. On the basis of this data, the controller 100 computes in the same way as Equation (1) above the dispersion compensation quantity that can be provided by using the extension terminals for which the optical switch 20 is not yet set and the extension terminals for which the object of alteration is being set (S51). In this case, it computes the dispersion compensation quantities (C5, C7, C8, C11, C12, C13, C14 and C15) (wherein each of C5, C7, C8, C11, C12, C13, C14 and C15 is 0 or 1).

The controller 100 displays this results on the monitoring control terminal 200 (e.g. "2 ps/nm", "4 ps/nm", "6 ps/nm", . . . "2352 ps/nm", "2590 ps/nm", . . . , "2876 ps/nm" and "2878 ps/nm") (S52). Looking at this displayed result, the operator selects either alteration or cancellation (S53). If he selects alteration, the operator will proceed to S54 and select the appropriate one out of the displayed dispersion compensation quantities (e.g. "2352 ps/nm") (S54). Then, the controller 100 performs change-over deletion and change-over setting on the optical switch 20 on the basis of the selected dispersion compensation quantity (S55). In accordance with this set change-over, the controller 100 displays "2352 ps/nm" for the dispersion compensation quantity (S56) to end the flow. Or, if at S53 the operator fails to obtain the expected dispersion compensation quantity, he will select cancellation to end the sequence of operation. In such a case, if the program is executed again after replacing dispersion compensating modules 30 appropriately, the expected dispersion compensation setting is made possible.

If the deletion is selected at S23, the operator will proceed to S31 and selects the outside line terminal whose setting is to be deleted out of the set outside line terminals which are displayed (S31). The controller references the optical switch management table for the extension terminal to which the outside line terminal whose setting is to be deleted is connected (S32), and deletes the change-over setting of the optical switch 20 (returns it to an unset state) (S33). Then it stops displaying the dispersion compensation quantity of the outside line terminal whose setting has been deleted (S34) to end the flow.

In FIG. 16 illustrating the number of items required for dispersion compensators for fully covering the dispersion compensation quantity of 0 to 2048 ps/nm, the case in which conventional fixed-length dispersion compensating fibers are used and the case in which variable dispersion is used are compared. It is supposed here that optical switches used have eight each of input terminals and output terminals and that no change-over is set for existing optical switches. As shown in FIG. 16, as the graduations of dispersion compensation are made finer, while the number of items required for dispersion compensation steeply rises where fixed-length dispersion compensating fibers are used, the present invention keeps the increase very gradual. Thus, the invention can be particularly effective in reducing the number of items required for dispersion compensators where the required accuracy of dispersion compensation quantity is stringent.

This embodiment of the invention allows the dispersion compensation quantity to be set as desired. Also, it can readily adapt itself to any change in dispersion compensation due to trouble, relocation or the like. It also permits dispersion compensating modules not in use to be utilized by another optical transmission system.

Although one dispersion compensating fiber each of 12 different compensation quantities, consecutively doubled from 1 ps/nm to 2048 ps/nm, is used in this embodiment, the number is not limited to this, and it is sufficient for the dispersion compensation quantity of each dispersion compensating fiber to be double that of the fiber immediately before. It is also permissible to use plural fibers of the same dispersion compensation quantity.

The variable optical attenuator to be connected to the outside line output terminal of the optical switch and the Tap-PDs before and after it can be dispensed with. Similarly, the optical amplifier to be connected to the outside line input terminal of the optical switch and the Tap-PDs before and after it can be dispensed with when the input signal power is high.

The optical switch in the embodiment described above has M input×M outputs, N inputs units, N output units and (M−N) dispersion compensating modules. The optical switch may have unoccupied terminals besides them. In this case, the number of dispersion compensating modules would be less than (M−N).

Figure 17:
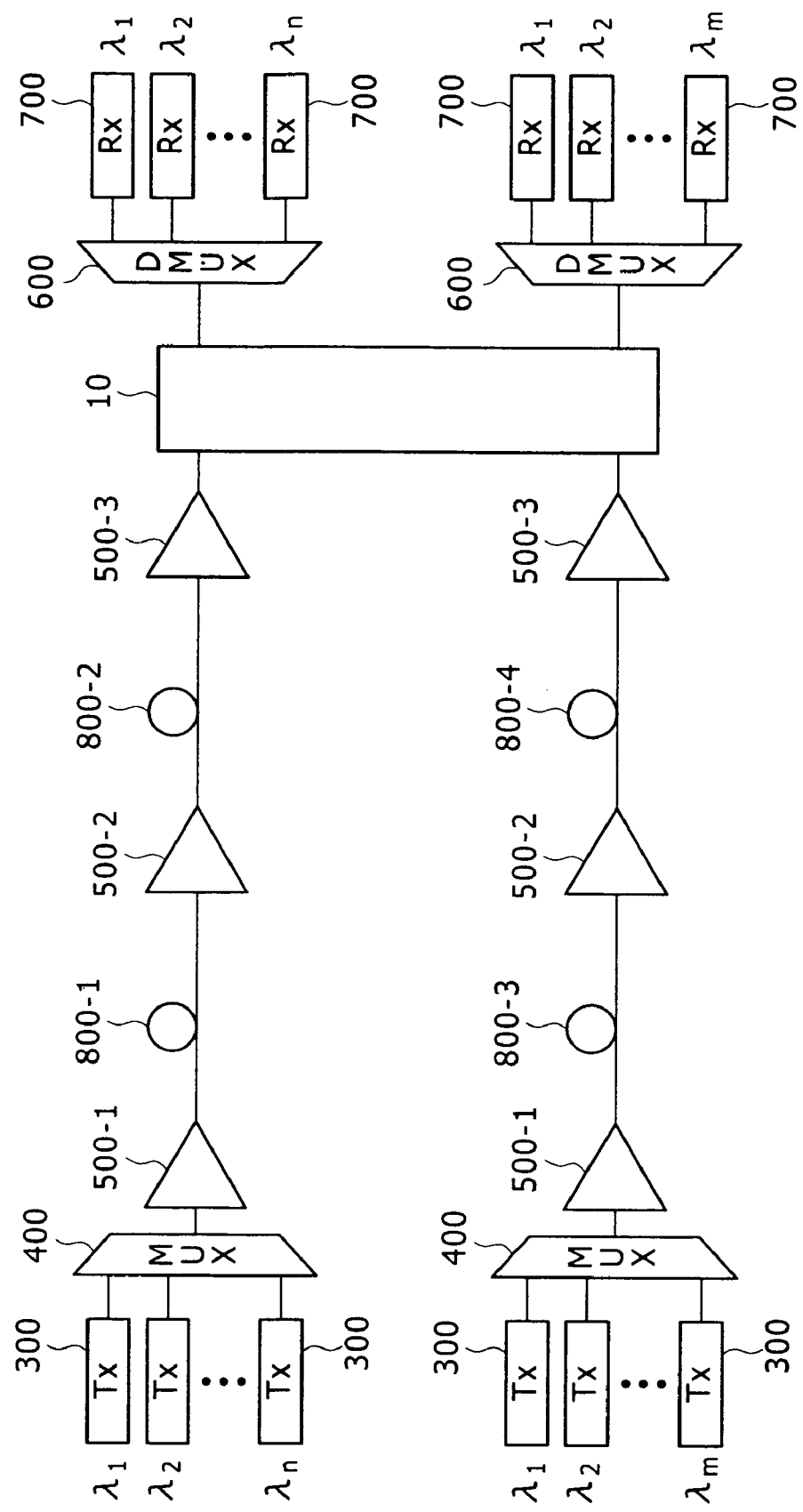
FIG. 17 is a block diagram of an optical transmission system.

An optical transmission system, which is another preferred embodiment of the present invention, will be described with reference to FIG. 17. FIG. 17 here is a block diagram of the optical transmission system illustrating the other embodiment of the invention.

Referring to FIG. 17, optical signals transmitted from n optical transmitters 300 each transmitting optical signals of a wavelength different from others are wavelength-multiplexed by a multiplexer 400. The wavelength-multiplexed optical signals are amplified by a transmit side optical amplifier 500-1 and sent out to a transmission path 800-1. The wavelength-multiplexed optical signals having passed the transmission path 800-1 are amplified again by a relay amplifier 500-2, and sent out to a transmission path 800-2. The wavelength-multiplexed optical signals having passed the transmission path 800-2 are amplified again by a receive side amplifier 500-3 and, after undergoing dispersion compensation matching the length/characteristics of the transmission path by the variable dispersion compensation equipment 10, wavelength-demultiplexed by a demultiplexer 600 into n optical signals differing in wavelength from one another to be received by receivers 700. The wavelength-multiplexed optical signals having passed transmission paths 800-3 and 800-4 also undergo dispersion compensation matching the length/characteristics of the transmission path by the variable dispersion compensation equipment 10.

More specifically, the wavelength-multiplexed optical signals from the transmission path 800-2 are connected to the Tap-PD 51-1 of the variable dispersion compensation equipment 10. On the other hand, the wavelength-multiplexed optical signals from the transmission path 800-4 are connected to the Tap-PD 51-2 of the variable dispersion compensation equipment 10.

In the terminology of this specification a system including optical transmitters and optical receivers are referred to as an optical transmission system. In the embodiment described above, two transmission systems share one variable dispersion compensation equipment as a common dispersion compensator. What is illustrated in FIG. 17 as a whole also constitutes an optical transmission system.

To add, it is preferable to connect fixed-length dispersion compensating fibers to the variable dispersion compensation equipment in series, and have rough adjustment performed with the dispersion compensating fibers and fine adjustment performed with the variable dispersion compensation equipment.

Also, as persons skilled in the art would obviously understand, the arrangement of the variable dispersion compensation equipment on the transmission system is not limited to the receiving side as shown in FIG. 17, but the equipment may as well be arranged on the transmitting side, in the relaying unit or even in each.

In this embodiment of the invention, a single variable dispersion compensation equipment can be commonly used by two optical transmission systems.

In the variable dispersion compensation equipment according to the invention, plural dispersion compensating modules, an optical switch and a controller can be provided and it is possible to set as desired the dispersion compensation quantity. It is possible to provide a variable dispersion compensation equipment which can readily adapt itself to any change in dispersion compensation due to trouble, relocation or the like.

What is claimed is:

1. A variable dispersion compensation equipment comprising an optical switch having M input terminals and M output terminals and capable of connecting any desired one of the input terminal and one of the output terminals, N input units connected to the input terminals of the optical switch, N output units connected to the output terminals of the optical switch, two or more but (M−N) or fewer dispersion compensating modules provided between one of the output terminals and one of the input terminals of the optical switch so as to compensate for dispersion of an optical signal from a connected output terminal of the optical switch and to provide a compensated optical signal and to transmit the compensated optical signal to a connected input terminal of the optical switch, and a controller for controlling the change-over of the optical switch, wherein:
   optical signals inputted to one of the input units are outputted, after being caused to pass at least one of the dispersion compensating modules, from one of the output units.

2. A variable dispersion compensation equipment comprising an optical switch provided with first, second and third input terminals and first, second and third output terminals, a first dispersion compensating module disposed between the first output terminal and the first input terminal of the optical switch so a to compensate for dispersion of an optical signal from the output terminal of the optical switch and to provide a compensated optical signal and to transmit the compensated optical signal to the first input terminal of the optical switch, a second dispersion compensating module disposed between the second output terminal and the second input terminal of the optical switch so as to compensate for dispersion of an optical signal from the second output terminal of the optical switch and to provide a compensated optical signal and to transmit the compensated optical signal to the second input terminal of the optical switch, and a controller for controlling change-over of the optical switch, wherein:
   optical signals inputted to the third input terminal of the optical switch, after traveling through the first dispersion compensating module or the second dispersion compensating module, or the first dispersion compensating module and the second dispersion compensating module, are outputted from the third output terminal of the optical switch.

3. The variable dispersion compensation equipment according to claim 1, further comprising:
   an optical amplifier for amplifying signal lights disposed between the dispersion compensating modules and the input terminals, a first Tap-PD disposed at a stage before the optical amplifier, and a second Tap-PD disposed at a stage after the optical amplifier, wherein:
   said controller controls the gain of the optical amplifier so that a ratio between a second optical power level monitored by the second Tap-PD and a first optical power level monitored by the first Tap-PD is kept within a predetermined range.

4. The variable dispersion compensation equipment according to claim 1, further comprising:
   a variable optical attenuator for attenuating signal lights, disposed between the output terminals and the dispersion compensating modules, a first Tap-PD disposed at a stage before the variable optical attenuator, and a second Tap-PD disposed at a stage after the dispersion compensating modules, wherein:
   said controller controls the attenuation quantity of the variable optical attenuator so that a ratio between a second optical power level monitored by the second Tap-PD and a first optical power level monitored by the first Tap-PD is kept within a predetermined range.

5. The variable dispersion compensation equipment according to claim 1, wherein:
   each of the dispersion compensating modules comprises a dispersion compensator and a discriminating circuit for discriminating the dispersion compensation quantity of the dispersion compensator,
   a first Tap-PD disposed at a stage before the dispersion compensating modules and a second Tap-PD disposed at a stage after the dispersion compensating modules are further provided, wherein:
   said controller performs control as to ensure so that there is no inconsistency of a difference between a second optical power level monitored by the second Tap-PD and a first optical power level monitored by the first Tap-PD with the dispersion compensation quantity discriminated by the discriminating circuit.

6. An optical transmission system comprising an optical transmitter for sending out optical signals, an optical receiver for receiving the optical signals, and a variable dispersion compensation equipment for compensating dispersion of the optical signals attributable to a transmission path, wherein:
   said variable dispersion compensation equipment includes an optical switch having M input terminals and M output terminals and capable of connecting any desired one of the input terminal and one of the output terminals, N input units connected to the input terminals, N output units connected to the output terminals, two or more but (M−N) or fewer dispersion compensating modules provided between one of the output terminals and one of the input terminals of the optical switch so as to compensate for dispersion of an optical signal from a connected output terminal of the optical switch and to provide a compensated optical signal and to transmit the compensated optical signal to a connected input terminal of the optical switch, and a controller for controlling change-over of the optical switch, wherein optical signals inputted to one of the input units are outputted, after being caused to pass at least one of the dispersion compensating modules, from one of the output units.

7. An optical transmission system comprising an optical transmitter for sending out optical signals, an optical receiver for receiving the optical signals, and a variable dispersion compensation equipment for compensating dispersion of the optical signals attributable to a transmission path, wherein:

said variable dispersion compensation equipment comprises an optical switch provided with first, second and third input terminals and first, second and third output terminals, a first dispersion compensating module disposed between the first output terminal and the first input terminal of the optical switch so as to compensate for dispersion of an optical signal from the first output terminal of the optical switch and to provide a compensated optical signal and to transmit the compensated optical signal to the first input terminal of the optical switch, a second dispersion compensating module disposed between the second output terminal and the second input terminal of the optical switch so as to compensate for dispersion of an optical signal from the second output terminal of the optical switch and to provide a compensated optical signal and to transmit the compensated optical signal to the second input terminal of the optical switch, and a controller for controlling change-over of the optical switch, wherein optical signals inputted to the third input terminal of the optical switch, after traveling through the first dispersion compensating module or the second dispersion compensating module, or the first dispersion compensating module and the second dispersion compensating module, are outputted from the third output terminal of the optical switch.

8. A method of a setting dispersion compensation quantity wherein input and output terminals of an optical switch which are adapted to have a dispersion compensating module connected therebetween so that an optical signal from a connected output terminal of the optical switch is compensated for dispersion so as to provide a compensated optical signal which is transmitted to a connected input terminal of the optical switch and which have unused dispersion compensating modules connected thereto are searched for, a dispersion compensation quantity that can be set on any of the unused dispersion compensating modules is displayed, and said optical switch is set so as to achieve a selected dispersion compensation quantity.

9. The method of setting a dispersion compensation quantity according to claim 8, said searching uses an optical switch management table in which connective relationships between the input terminals of the optical switch and the output terminals of the optical switch are stated.

* * * * *